UNITED STATES PATENT OFFICE.

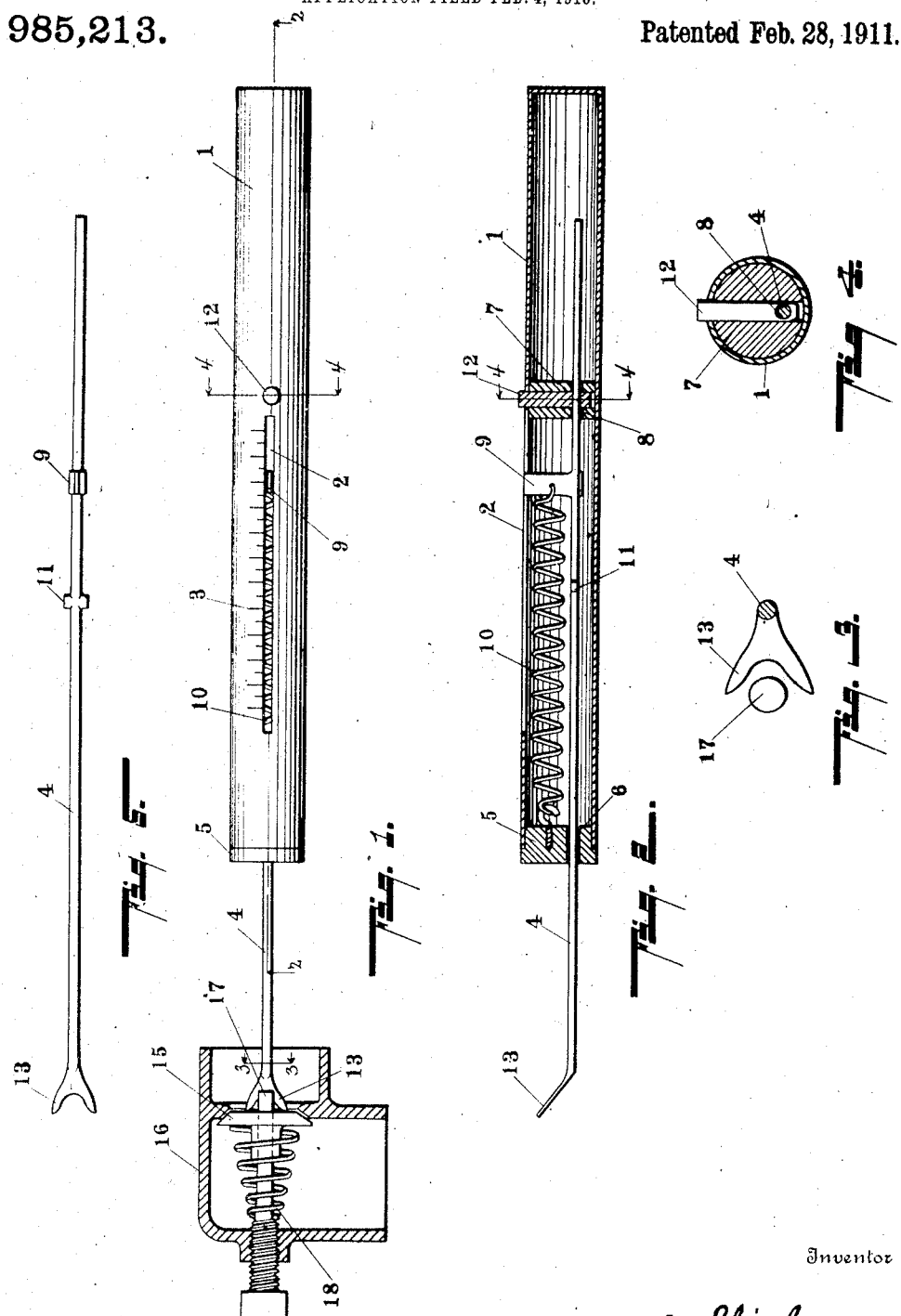

CYRUS C. SHIGLEY, OF GRAND RAPIDS, MICHIGAN.

VALVE-TENSION SCALE.

985,213.  Specification of Letters Patent.  Patented Feb. 28, 1911.

Application filed February 4, 1910. Serial No. 541,979.

*To all whom it may concern:*

Be it known that I, CYRUS C. SHIGLEY, a citizen of the United States, residing at Grand Rapids, county of Kent, State of Michigan, have invented certain new and useful Improvements in Valve-Tension Scales, of which the following is a specification.

This invention relates to improvements in scales.

My improved scale is especially designed by me for the testing of the tension of valves, such as carbureter valves, used in explosion engines.

The main objects of this invention are to provide an improved scale whereby valves can be readily tested to determine the tension thereon, without disassembling or removing from the engine or other place of use, such as automobiles and like motor vehicles. Further, to provide an improved scale adapted for the uses stated, which is simple and economical in structure and very convenient to use.

Further objects, and objects relating to structural details, will definitely appear from the detailed description to follow.

I accomplish the objects of my invention by the devices and means described in the following specification.

The structure described constitutes one effective embodiment of my invention. Other embodiments would be readily devised by those skilled in the art.

The invention is clearly defined and pointed out in the claims.

A structure constituting an effective and preferred embodiment of the features of my invention is clearly illustrated in the accompanying drawing, forming a part of this specification, in which:

Figure 1 is a plan view of a structure embodying the features of my invention, the same being shown associated with a carbureter valve, to illustrate the manner of using the scale. Fig. 2 is a longitudinal section, taken on a line corresponding to line 2—2 of Fig. 1, the scale rod being shown in full lines. Fig. 3 is a detail section, taken on a line corresponding to line 3—3 of Fig. 1. Fig. 4 is a detail section, taken on a line corresponding to line 4—4 of Figs. 1 and 2. Fig. 5 is a plan view of the scale rod.

In the drawing, similar reference characters refer to similar parts throughout the several views, and the sectional views are taken looking in the direction of the little arrows at the ends of the section lines.

Referring to the drawing, I provide a casing 1, which is preferably cylindrical or barrel-like in form and of a size to be conveniently grasped so that it serves as a hand piece. This casing is slotted at 2, and provided with suitable scale indicia 3, at one edge of the slot.

The scale bar or rod 4 is slidably arranged through the end piece 5 of the casing, which is, in the structure illustrated, in the form of a plug, the hole 6 in the end piece being arranged at one side of the center of the plug, as clearly appears in the drawing.

A support 7 is provided for the inner end of a rod, the support having a hole 8 therethrough to receive the rod arranged in alinement with the hole 6 in the end piece 5. On the rod is an indicia finger 9, which projects into the slot 2 in the casing to prevent turning of the scale rod, and also to bring the end of the finger into proper relation to the scale indicia. A tension spring 10 is connected to the finger 9, and to the end piece 5.

A stop 11 is provided for limiting the outward movement of the rod, the stop being arranged to engage the end piece. For holding the rod in position to permit more convenient reading, I provide a clutch. This, in the structure illustrated, consists of a clutch member 12, which is slidably arranged in the support 7, to project through the casing in position to be engaged with the thumb. The scale rod is arranged through this clutch member 12, which coacts with the support in clutching the rod. When pressure is applied to the member 12, the rod is gripped between the members 7 and 12, but, when released, it slides freely therethrough.

The rod 4 is preferably provided with a forked offset foot 13, which is adapted to engage the valves, as 15, of carbureters, as 16, at a central point, the forked foot straddling the valve guide rod 17, which is, of course, centrally arranged. This rod is, in common construction of carbureters, threaded into the carbureter casing or body, and serves to adjust the tension spring 18. As is well konwn, the carbureter valve should be properly tensioned in order to secure the best results.

It is common practice, so far as this applicant is aware, to guess or estimate the tension or to gage it by comparison with other valves known to be properly tensioned. By the use of this device, the tension may be accurately measured, and this may be done conveniently and quickly without the disassembling of the carbureter or valves.

I have illustrated and described my improvements in the form in which I have embodied the same, and which form I find to be satisfactory. I am, however, aware that the structural features may be considerably modified, but, as it is believed these modifications will be obvious to those skilled in the art to which this invention relates, I do not attempt to illustrate and describe the same herein.

I claim:

1. In a device of the class described, the combination of a barrel-like casing, adapted to serve as a hand piece and having a slot therein and scale indicia associated therewith; a scale rod having an index finger thereon arranged in said slot; an end piece for said casing through which said rod is slidably arranged; a tension spring connected to said index finger and to said end piece; a support through which the inner end of said rod is slidably arranged; and a clutch member through which said scale rod is arranged, slidably arranged in said support to project from said barrel and coacting with said support to form a clutch for said rod.

2. In a device of the class described, the combination of a barrel-like casing, adapted to serve as a hand piece and having a slot therein and scale indicia associated therewith; a scale rod having an index finger thereon arranged in said slot; an end piece for said casing through which said rod is slidably arranged; a tension spring for said scale rod; a support through which the inner end of said rod is slidably arranged; and a clutch member through which said scale rod is arranged, slidably arranged in said support to project from said barrel and coacting with said support to form a clutch for said rod.

3. In a device of the class described, the combination of a casing adapted to serve as a hand piece and having a slot therein and scale indicia associated therewith; a scale rod having an index finger thereon arranged in said slot, said index finger being adapted to support said scale rod against rotative movement, said scale rod having an off-set forked foot at its outer end, said off-set being in the direction of said index finger; a tension spring for said scale rod connected to said index finger; a support through which the inner end of said rod is slidably arranged; and a clutch for said rod projecting from the said casing to form a finger piece.

4. In a device of the class described, the combination of a casing adapted to serve as a hand piece and having a slot therein and scale indicia associated therewith; a scale rod having an index finger thereon arranged in said slot, said index finger being adapted to support said scale rod against rotative movement, said scale rod having an off-set forked foot at its outer end, said off-set being in the direction of said index finger; a tension spring for said scale rod connected to said index finger; and a support through which the inner end of said rod is slidably arranged.

5. In a device of the class described, the combination of a body having scale indicia associated therewith; a scale rod having an indicia index thereon; a support through which the inner end of said scale rod is slidably arranged; and a clutch member through which said scale rod is arranged, slidably associated with said support to project through said body and coact with said support to form a clutch for said rod.

In witness whereof, I have hereunto set my hand and seal in the presence of two witnesses.

CYRUS C. SHIGLEY. [L. S.]

Witnesses:
J. G. TURCK,
PATRICK McLAUGHLIN.